US008676661B2

(12) United States Patent
Oikonomidis

(10) Patent No.: US 8,676,661 B2
(45) Date of Patent: Mar. 18, 2014

(54) COMMODITY BACKED PAYMENT SYSTEM FOR SOCIAL NETWORKS

(76) Inventor: Artases Oikonomidis, Moscow (RU)

( * ) Notice: Subject to any disclaimer, the term of this patent is extended or adjusted under 35 U.S.C. 154(b) by 0 days.

(21) Appl. No.: 13/399,930

(22) Filed: Feb. 17, 2012

(65) Prior Publication Data
US 2013/0218753 A1 Aug. 22, 2013

(51) Int. Cl.
*G06Q 30/00* (2012.01)
*G06Q 40/00* (2012.01)

(52) U.S. Cl.
USPC ............................ 705/26.1; 705/35; 705/39

(58) Field of Classification Search
USPC ........................................ 705/26.1, 35, 39
See application file for complete search history.

(56) References Cited

U.S. PATENT DOCUMENTS

| | | | | |
|---|---|---|---|---|
| 5,983,207 | A * | 11/1999 | Turk et al. ................... | 705/39 |
| 7,206,763 | B2 | 4/2007 | Turk | |
| 7,254,557 | B1 | 8/2007 | Gillin et al. | |
| 7,742,972 | B2 | 6/2010 | Lange et al. | |
| 8,015,089 | B1 | 9/2011 | Baya'a et al. | |
| 2005/0086153 | A1 | 4/2005 | Scott | |
| 2006/0155638 | A1 | 7/2006 | de la Motte | |
| 2007/0022375 | A1 | 1/2007 | Walker | |
| 2007/0125840 | A1 | 6/2007 | Law et al. | |
| 2007/0244812 | A1 | 10/2007 | Turk et al. | |
| 2008/0228627 | A1 * | 9/2008 | Himmelstein ............... | 705/37 |
| 2009/0076941 | A1 | 3/2009 | Schneierson et al. | |
| 2009/0094134 | A1 * | 4/2009 | Toomer et al. .............. | 705/26 |
| 2010/0010918 | A1 | 1/2010 | Hunt | |
| 2010/0063873 | A1 | 3/2010 | McGucken | |
| 2010/0299257 | A1 | 11/2010 | Turk | |
| 2011/0258686 | A1 * | 10/2011 | Raj et al. ..................... | 726/6 |
| 2012/0066122 | A1 * | 3/2012 | Goldberg ..................... | 705/41 |
| 2012/0317034 | A1 * | 12/2012 | Guha et al. .................. | 705/65 |
| 2013/0024360 | A1 * | 1/2013 | Ballout ........................ | 705/39 |

OTHER PUBLICATIONS

"Digital Silver Payments on Facebook? Yes ! An Interview with Sidharth Sankar, the Founder of ZipPay." By Mark Herpel. Yahoo ! Contributer Network. Aug 16, 2011. pp. 1-7.*
"Send & Receive Digital Silver on Facebook: An Interview with Sidharth Sankar Founder of Zip Pay," By Mark Herpel. DGC. Aug. 2011, Issue 45. pp. 5-6, pp. 1-43.*
Kim Zetter, Bullion and Bandits: The Improbable Rise and Fall of E-Gold, http://www.wired.com/threatlevel/2009/06/e-gold/all/1, Sep. 6, 2009.
Kuttner et al, Personal On-Line Payments, http://www.angelfire. com/indie/sharmapranav/ForThesis/1201kutt.pdf, Dec. 2001.

* cited by examiner

*Primary Examiner* — Sara C Hamilton
(74) *Attorney, Agent, or Firm* — Franklin & Assoicates International; Matthew Lambrinos

(57) ABSTRACT

Embodiments are directed towards providing a computer-implemented method and a network device that provides an electronic payment system for social networks, including maintaining (i) records of registered users, (ii) records of registered merchants, (iii) a credit account for each registered user and registered merchant wherein credits are backed by a commodity and a credit corresponds to a fraction of a standard unit of the commodity, receiving from a user device instructions to deposit a designated amount of currency from a user's account into the user's credit account, using the received instructions, obtaining the designated amount of currency, electronically purchasing from a seller an amount of a specified commodity equivalent to the designated amount of currency minus any transaction fee assessed by the seller, and updating the user's credit account by adding a number of credits equivalent to the amount of the purchased commodity.

21 Claims, 8 Drawing Sheets

COMMODITY BACKED PAYMENT SYSTEM FOR SOCIAL NETWORKS

TECHNICAL FIELD

Various embodiments generally relate to a social networking system and financial systems. More specifically, the present invention relates to a system and method for using commodities such as gold to back user and merchant accounts.

BACKGROUND

Social networks have emerged to become among the most popular destinations on the World Wide Web (WWW). While social networks initially provided only basic messaging, music and photo-sharing services, they have evolved to include games, location-based services and e-commerce. In some cases, users of social networks may want to maintain readily available funds within a payment system that works smoothly within their preferred social network.

Social networks operate across country borders; both the users and merchants that offer goods and services to social network users may be in any geographic location. However, due to the instability of certain currencies, it may be advantageous for user to keep funds within a social network in a currency different than their local network. Thus, a payment system for a social network that operates internationally and that is backed by a stable financial system would prove advantageous for users of and merchants that participate in the social network.

Gold, silver and other marketable commodities have the advantage of maintaining value in the face of fluctuations in the value of national currencies. In particular, gold has increased in value relative to most currencies over the past several decades. For many social network users, a payment system in which they can deposit and maintain funds, use the funds for e-commerce payments, and which is backed by gold or another commodity would be advantageous.

Thus, it is with respect to these considerations and others that the present invention has been made.

SUMMARY OF THE DESCRIPTION

Various embodiments are directed towards a payment system for social networks in which funds maintained by the system are converted to a commodity such as gold.

In one embodiment, the payment system enables a user to make deposits in their local currency, purchases gold or another backing commodity, and adds cafe credits to a commodity backed cafe account that it maintains for the user. The user can make purchases with his/her cafe credits from merchants that participate in the payment system. In addition, the user can transfer cafe credits to a cash account that is maintained by the payment system in the user's local currency.

In one embodiment, all transfers from a user's cash account must pass through his/her cafe account and result in the purchase of the backing commodity.

In one embodiment, the payment system assesses a fee, such as a percentage or fixed fee for some or all financial transactions.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION

Figure 1:
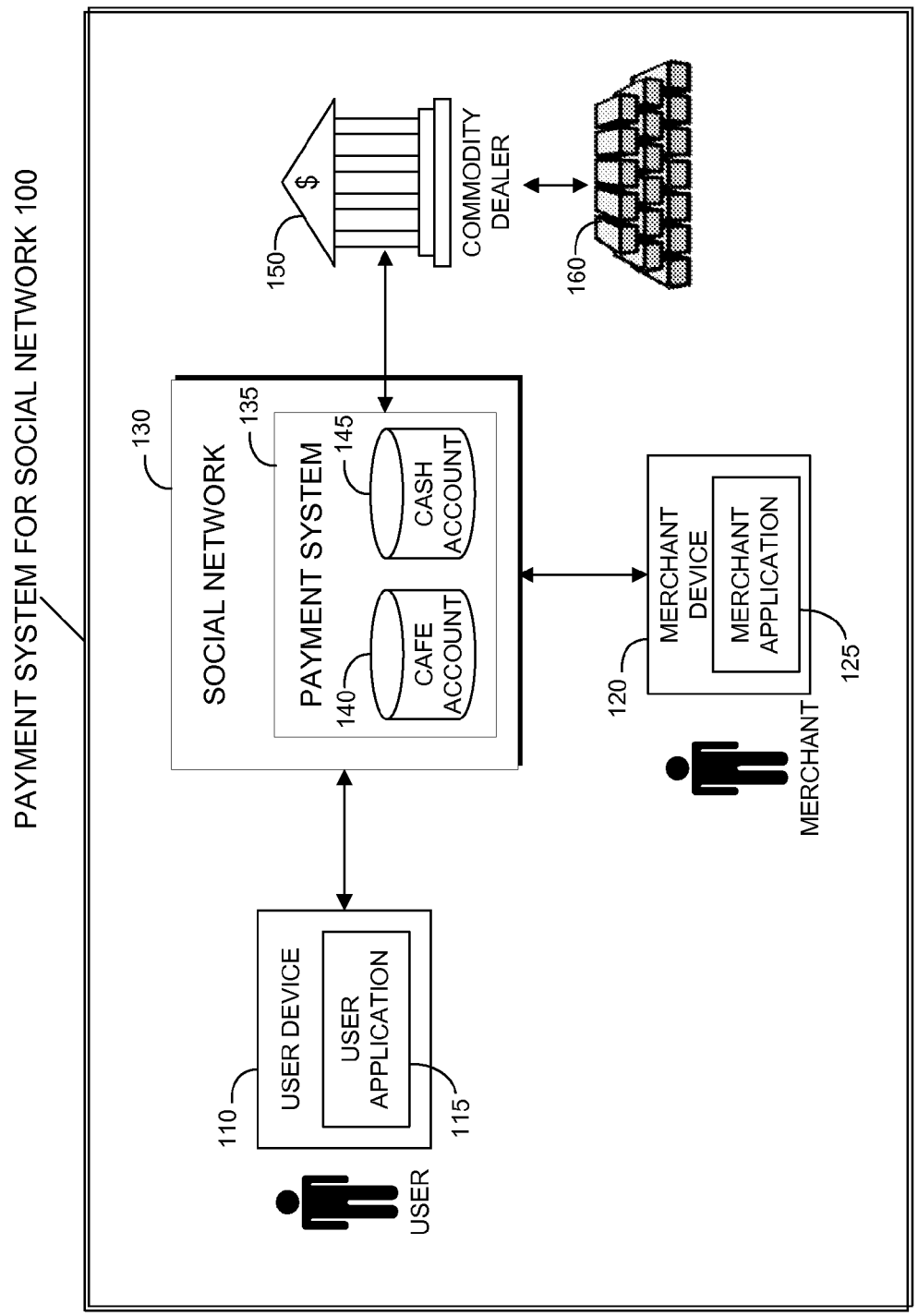
FIG. 1 is a generalized block diagram of a preferred embodiment of a payment system provided by a social network in which the payment system maintains accounts for users and merchants and enables users to purchase items and perform financial transactions.

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Social network—means a computer-based system that enables its users to perform actions such as sharing of information, playing electronic games and purchasing of items of merchandise and/or services (also referred to herein simply as "items").

Social network payment system, or payment system—as used herein a social network payment system provides financial accounts for users and merchants that enable the account owner to deposit and withdraw funds, make and receive payments, and transfer funds to other accounts.

User—refers an individual that uses a personal computer (PC), mobile device, or other electronic device to access and use across an electronic network the services provided by a social network. A registered user is a user that has registered with the social network such that he/she is allowed to perform financial transactions using the payment system.

Merchant—refers to an individual or organization that offers items of merchandise and/or services for electronic purchase by registered users of the social network using the social network payment system.

Commodity—refers to gold, silver, or other marketable item.

Backing commodity—refers to the commodity that is used to back credits issued in users' and merchants' financial accounts within the social network. Essentially, for each cafe credit issued by the payment system it purchases and holds a specified amount of the backing commodity. Thus, for most money transactions within the social network the backing commodity effectively acts as the monetary unit.

Some of the examples provided herein are constrained to a payment system in the context of a social network. However, the methods, processes, and systems described herein can be applied to other systems in which users and merchants perform financial transactions such as, but not limited to, virtual shopping malls and websites, e-commerce systems, and virtual communities.

Generalized Operation

The operation of certain aspects of the invention is described below with respect to FIGS. 1-5.

Now reference is made to FIG. 1, which is a generalized block diagram of a preferred embodiment of a payment system 100 provided by a social network in which the payment system maintains accounts for users and merchants and enables users to purchase items and perform financial transactions. A user interacts with a social network 130 via a user application 115 that runs in a user device 110. User application 115 operating in conjunction with social network 130 enables a user to perform social networking functions such as sending messages and email, posting and viewing photos and other media, selecting and interacting privately with friends. Social network 130 includes a payment system 135 that enables a user to inter alia maintain funds, purchase items and perform financial transactions. User application 115 is described in further detail hereinbelow with reference to FIG. 2 and user device is described in further detail hereinbelow with reference to FIG. 4.

A merchant uses a merchant application 125 that runs in merchant device 120 to maintain a store or catalog of items for sale within social network 130. The items may be inter alia physical items such as clothes, printed photos and posters, or services such as music sharing, participation or virtual currency in electronic games offered by social network 130. Merchants that participate in social network 130 receive payment for their goods and services via payment system 135.

Social network 130 makes a variety of services available across an electronic network to users and merchants. Social network 130 may be embodied as one or more server computers, a cloud service or in other ways. One embodiment of social network 130 is described with reference to FIGS. 4-5 hereinbelow.

For each registered user or merchant, payment system 135 maintains a cafe account 140, which is a commodity-backed financial account, and one or more currency-based cash accounts 145. Most typically there will be a single cash account 145 for each user and merchant, but in some embodiments a user or merchant may establish more than one cash account 145.

In one embodiment, a user or merchant is requested to register the first time they use social network 130. In this embodiment, social network 130 provides an electronic form to user device 110, which the user completes interactively using user application 115. The electronic form requests information such as the user or merchant's name, contact information, and potentially other identifying information such as a passport number, driver's license or social security number. Additionally, authentication information such as a username and password may be requested. Additional information may be requested of a user such as their interests, favorite music and so forth. In addition, the user or merchant may be requested to provide information about one or more financial instruments such as a credit card, or bank account that will be used to deposit money into their cafe account. Registration information is stored by social network 130 in a user database or merchant database respectively, described in further detail with reference to FIG. 5.]

Registration by a user establishes the local currency to be used for the user for subsequent interactions between the user and payment system 145. For example, if the user registers as a resident of the United States, then U.S. dollars will be used as the local currency for the user. However, this does not prevent the user from performing transactions in another local currency, for example when travelling. Further, the user can select a different local currency at any time.

A user or merchant may deposit currency in the local currency into his/her cafe account 140. Payment system 135 purchases gold or another commodity with the deposited currency and credits the user or merchant's cafe account with a corresponding amount of cafe credits. Henceforth, the term "backing commodity" is used to refer to the commodity chosen by the operator of social network 130 to back cafe credits in users' and merchants' cafe accounts. Typically, a cafe credit refers to a fraction of a unit of the backing commodity. For example, a cafe credit may refer to one thousandth of a troy ounce of gold. In this example, if the user deposits $3,000 U.S. dollars (USD) and the current price for gold is $1,500 USD per troy ounce, then a cafe credit is worth $1,500 USD/1000=$1.5 USD and a user's cafe account is credited with 2,000 cafe credits. The mechanism for purchasing gold or another commodity by payment system 135 is described hereinbelow with reference to FIG. 5.

In one embodiment, payment system 135 deducts a transaction fee for each transaction, such as depositing, withdrawing, transferring or making payments. A transaction fee may be, for example, a percentage of the transaction amount subject to a minimum payment or may be a fixed fee. Thus, in the above example, if a 1% transaction fee is assessed on deposits, then for a $3000 USD deposit, a transaction fee of $30 USD would be assessed and the user would receive 1980 cafe credits rather than 2000.

Payment system 130 maintains a cafe credit account balance based on the value of the backing commodity; the value of the credits in the cafe account fluctuate as the market price of the commodity changes over time.

Cafe credits are used within social network 130 as the standard form of payment for goods and services. Thus, in order to make a purchase from a merchant, or spend virtual currency in an electronic game a user has to purchase cafe credits. Similarly, a merchant receives cafe credits in their cafe account when a user purchases an item from them.

Payment system 135 purchases amounts of gold, or other backing commodity 160, electronically from an external financial service, referred to as a commodity dealer 150. Commodity dealer 150 may be a government entity, such as the U.S. mint that sells gold at wholesale prices, a bank, a commodity clearinghouse such as the International Commodity Clearinghouse (ICCH). In some cases, commodity dealer 150 offers an option to take receipt of the physical commodity 160. Alternatively, payment system 135 may receive an electronic receipt or certificate that can later be exchanged for currency. Typically, commodity dealer 150 charges a commission for each purchase or sale of the commodity, which is typically a percentage of the transaction amount or a fixed fee.

In one embodiment, payment system 135 purchases an amount of the backing commodity in real-time whenever cafe credits are purchased in exchange for currency. In another embodiment, payment system 135 aggregates a number of purchases and makes a bulk purchase. This may be done, for example, to secure a better price by purchasing in bulk, to seek a better price than the current market price for the backing commodity or to reduce transaction fees.

In one embodiment, a corresponding cash account 145 and cafe account are established for a user by payment system 135. The accounts may be established, for example, upon successful registration by the user or at the time of the first deposit into his/her cafe account by the user. A user may transfer funds from his/her cafe account into the corresponding cash account, in which case payment server 135 issues instructions to sell an amount of backing commodity equivalent to the desired transfer amount. The desired transfer amount may be specified in cafe credits or local currency. Conversely, the user can transfer money from his/her cash account into his/her cafe account 140, in which case payment system 135 applies the specified amount of currency from the cash account to purchase the backing commodity and an appropriate number of cafe credits are credited to the user's cafe account. Additionally, a user can issue instructions, using user application 115 to transfer currency from his/her cash account to another cash account. For example, a user may transfer currency from his/her cash account to the cash account of a merchant or of another user. If a user has more than one cash account he/she can transfer currency between cash accounts. In one embodiment, when a user transfers from his/her cash account to another cash account, it is first transferred to his/her cafe account. Then cafe credits are transferred to the recipient's cafe account. Finally, cafe credits are transferred into the recipient's cash account using the previously described method. In another embodiment, currency may be transferred directly between cash accounts.

Figure 2:
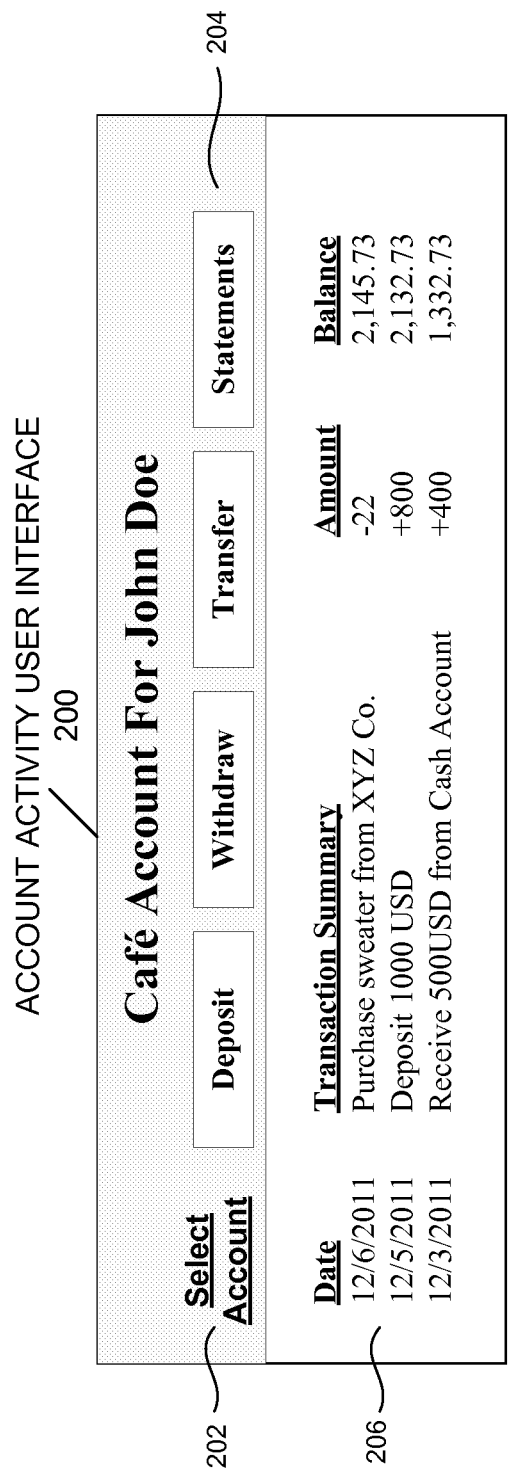
FIG. 2 illustrates one embodiment of a user interface for a payment system that enables a user to view account activity and to initiate financial transactions.

FIG. 2 illustrates one embodiment of a user interface for a payment system that enables a user to view account activity and to initiate financial transactions. Account activity user interface 200 is provided to a user, referred to in the figure as John Doe, by user application 115 running in user device 110. In one embodiment, user interface 200 is implemented as an interactive Web page that is provided by social network 130 to user device 110 for display through a Web browser. In this embodiment, user application 115 is implemented as HTML5 instructions provided by social network 130 that are processed the Web browser running in user device 110.

An account selection control 202 enables the user to select from among his/her various accounts. For example, the user may select his/her cafe account or his/her cash account. A set of main controls 204 enable the user to select a financial transaction to perform. As illustrated, financial transactions available may include depositing funds into an account, withdrawing funds from an account, transferring funds to an account, and obtaining a statement for an account.

An account activity panel 206 enables the user to view previous transactions for an account. The transactions may be ordered inter alia chronologically or reverse chronologically. In the embodiment illustrated in user interface 200 each line in account activity panel 206 represents one transaction. Information provided for each transaction includes the date of the transaction, a summary of the transaction which includes the amount of the transaction in local currency, the amount of the transaction in cafe credits, and the balance in the account after completion of the transaction. In one embodiment, the user can request additional details for each transaction.

Figure 3A:
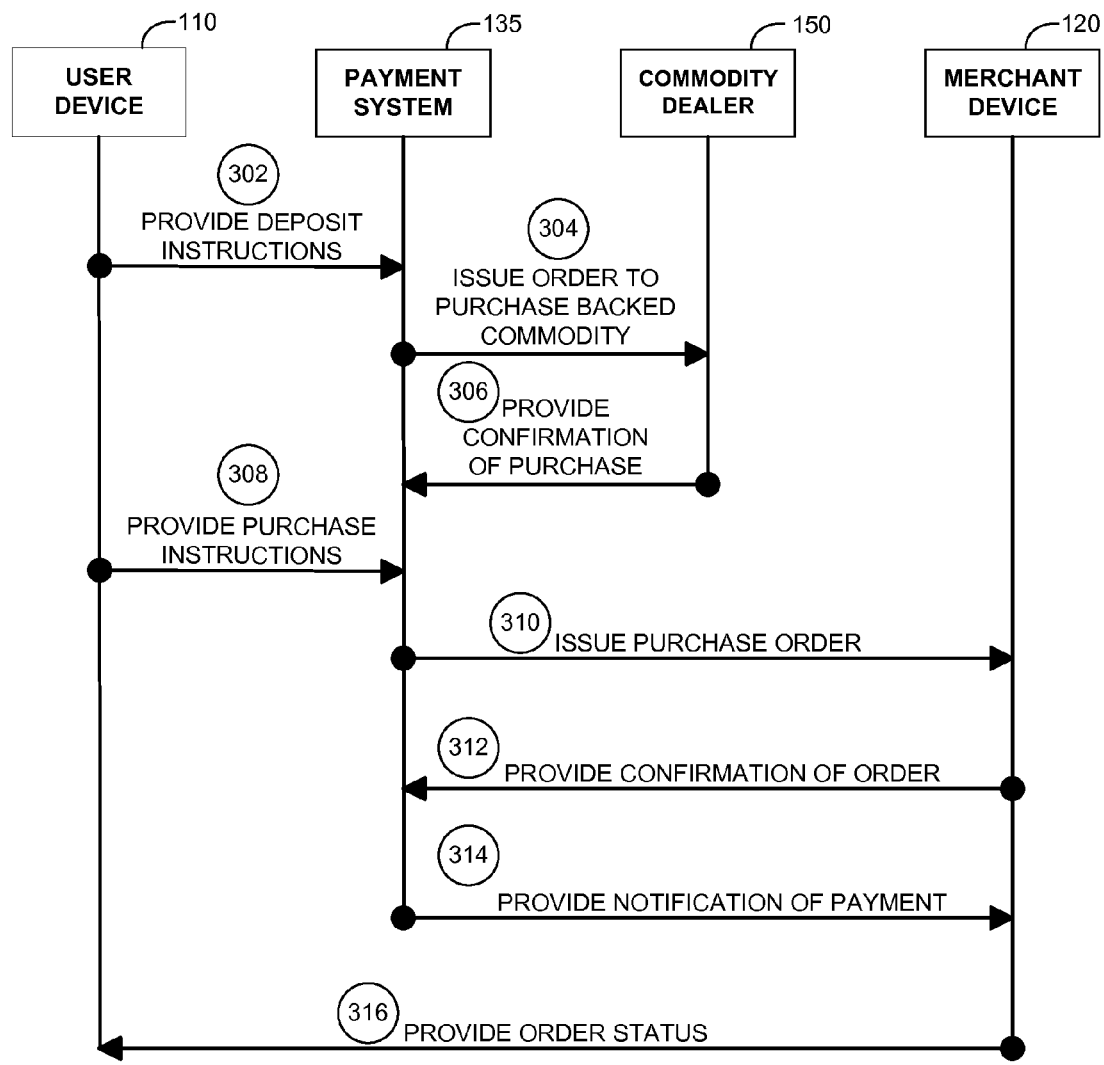
FIG. 3A is a transaction diagram that depicts the steps performed by a user device, a social network payment system, a commodity dealer and a merchant to enable a user to deposit funds into a cafe account maintained by the payment system, and to pay for an item offered by a merchant.
Figure 3B:
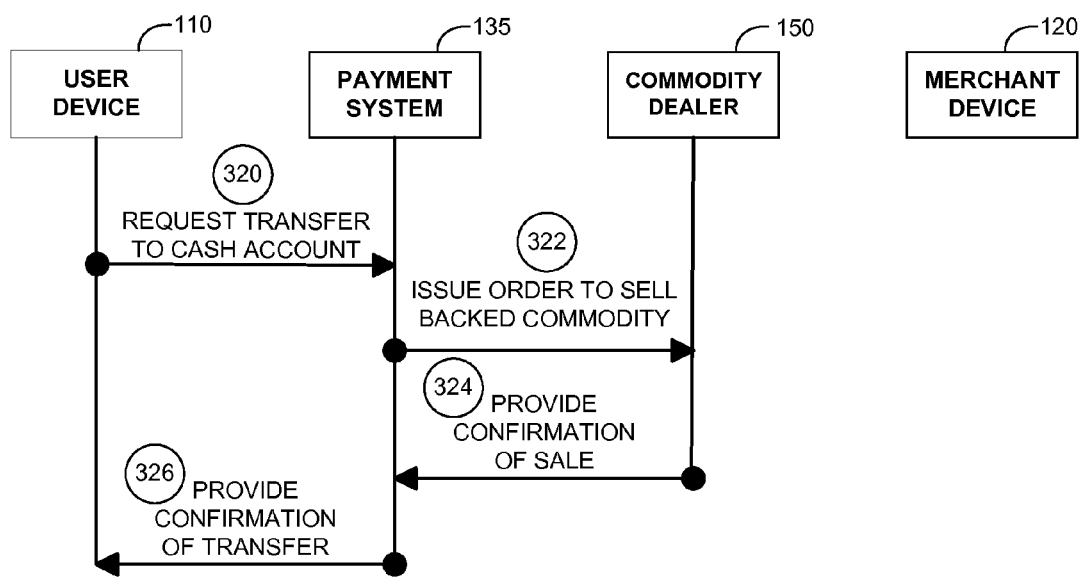
FIG. 3B is a transaction diagram that depicts the steps performed by a user device, a social network payment system, and a commodity dealer to enable a user to transfer funds from his/her cash account to his/her cafe account.
Figure 5:
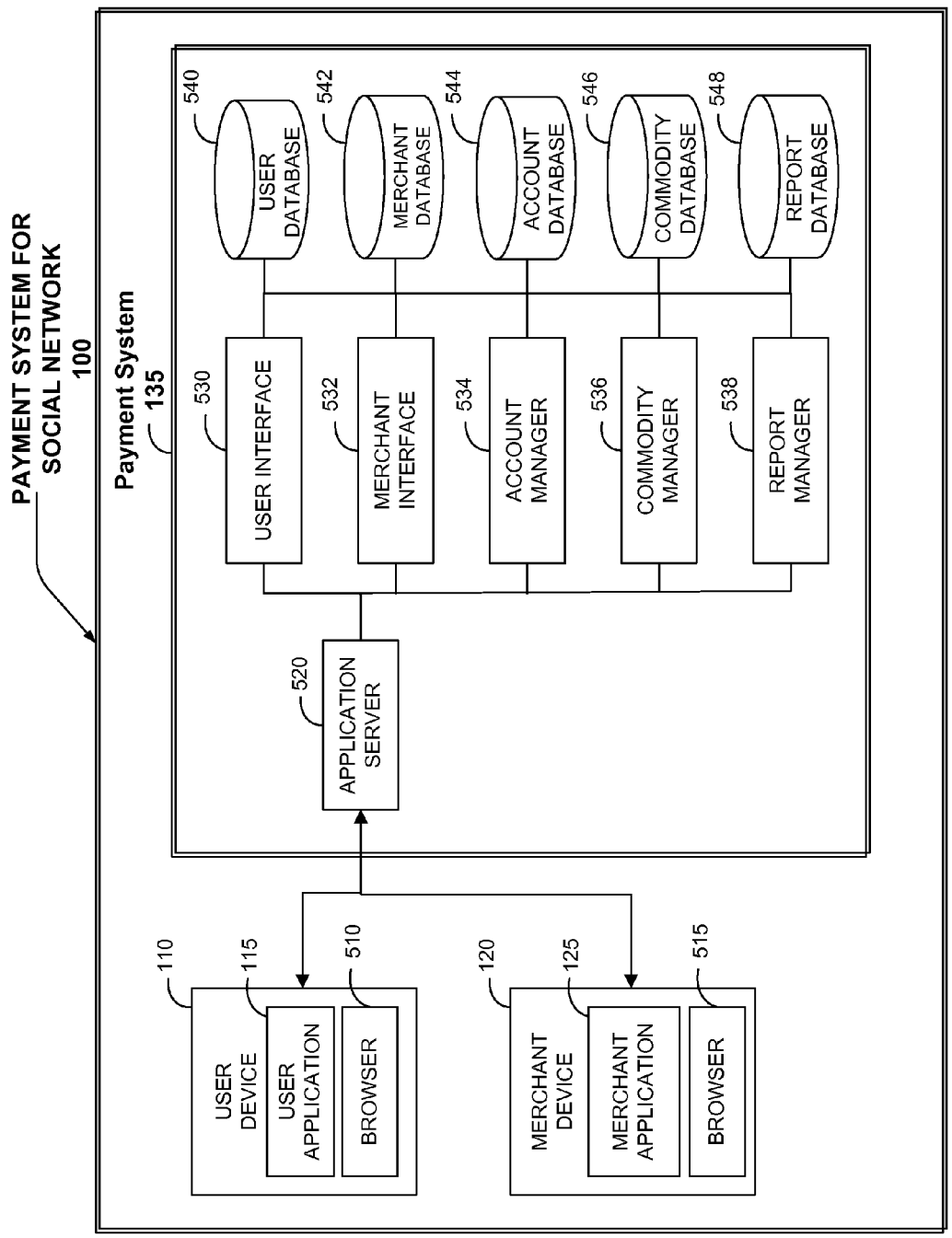
FIG. 5 is block diagram of the exemplary software modules of a payment system, implemented as a payment system server.

FIGS. 3A-B, and 5 are transaction diagrams and component diagrams in which each graphical element, including rectangles, circles, cylinders, triangles, and directional lines, can be implemented by computer program instructions. These program instructions may be provided to a processor and then executed by the processor, thus creating means for implementing the actions represented by the graphical element. The computer program instructions may be executed by a processor to cause a series of operational steps to be performed by the processor to produce a computer-implemented process such that the instructions, which execute on the processor to provide steps for implementing the actions represented by the graphical element. Some of the computer program instructions may be performed in parallel, or across more than one processor, such as might arise in a mufti-processor computer system. In addition, the actions represented by one or more graphical elements may also be performed concurrently with actions represented by other graphical elements, or even in a different sequence than illustrated without departing from the scope or spirit of the invention. It will also be understood that the actions represented by each graphical element and by combinations of graphical elements can be implemented by special purpose hardware-based systems that perform the specified actions or steps, or combinations of special purpose hardware and computer instructions.

FIG. 3A is a transaction diagram that depicts the steps performed by a user device, a social network payment system, a commodity dealer and a merchant to enable a user to deposit funds into a cafe account maintained by the payment system, and to pay for an item offered by a merchant. A user initiates the sequence by using user application 115 to request the deposit of funds into his/her cafe account. Consequently, at step 302 user device 110, in which user application 115 executes, sends a request message to payment system 135 to perform a deposit. The request message includes instructions for performing the deposit including inter alia the deposit amount in the local currency, the user's name and other authentication information. The request method may include method of payment information that specifies the source of the funds to be deposited; alternatively, a pre-designated financial account, such as a credit card account, bank account, or an online payment account such as a PAYPAL account, may be used to fund the deposit. Upon receiving the request, message payment system 135 uses the user-specified method of payment information to obtain the funds. If the funds cannot be obtained then an error message is sent to user device 110 and the method terminates.

At step 302 payment system 135 issues an order to commodity dealer 150 to purchase an amount of the backing commodity equivalent to the deposit amount at the prevailing market rate of the backing commodity. At step 306 commodity dealer, after executing the purchase order, sends a confirmation of purchase indicating the amount of the commodity purchased, the unit price and their transaction fee. Payment system 135 accordingly credits the user's cafe account with the appropriate number of credits, based on the amount of the backing commodity purchased.

At step 308, the user, as a result of interactions with social network 130 such as browsing merchandise, or playing an electronic game, or the like, makes a purchase from a merchant participating in social network 130. Accordingly, also at step 320, user device 110 sends purchase instructions to payment system 135 to make the purchase. At step 310 payment system 135 identifies the merchant of record for the selected item and issues a purchase order to the corresponding merchant device 120 indicating inter alia the item(s) to be purchased, their respective amounts, and the name of and contact information for the user.

At step 312 merchant device 120 provides a confirmation to payment system 135 that the order can be successfully fulfilled. Payment system 135 then debits the appropriate amount of cafe credits from the user's cafe account and credits them to the cafe account of the merchant of record. Payment system 135 may deduct a transaction fee from the purchase amount in which case the amount paid to the merchant of record is the agreed upon purchase price minus the transaction fee. Payment system 135 then, at step 314 provides to merchant device 120 notification that payment has been made. In this embodiment, the merchant doesn't ship an ordered product or provide a service until it first receives payment. In other embodiments, payment may be made after or synchronously with delivery of the item(s).

Finally, at step 316 the merchant device sends an electronic notification of the status of the order to the user via his/her user device 110. For example, the electronic notification might include instructions on how to electronically download a purchased song, or might provide shipping details for a physical item of merchandise that is being shipped to the user.

Reference is now made to FIG. 3B, which is a transaction diagram that depicts the steps performed by a user device, a social network payment system, and a commodity dealer to enable a user to transfer funds from his/her cash account to his/her cafe account. A user initiates the sequence by using user application 115 to request a transfer of funds from his/her cafe account to his/her cash account. Consequently, at step 320 user device 110, in which user application 115 executes, sends a request message to payment system 135 to perform a transfer. The request message includes the amount of cafe credits or the amount of local currency to be transferred.

At step 322 payment system 135 issues an order to commodity dealer 150 to sell an amount of the backing commodity equivalent to the transfer amount requested at the prevailing market rate of the backing commodity. At step 324 commodity dealer, after executing the purchase order, provides a confirmation of sale to payment system 135 indicating the amount of the commodity sold, the unit price at which the commodity was sold and their fee for the transaction. The sale proceeds, minus any transaction fee are placed in an electronic account designated by payment system 135. Payment system 135 accordingly debits the user's cafe account according to the amount of the sale and credits the user's cash account with the amount of the sale minus any transaction fee in the local currency. Finally, at step 326 payment system 135 electronically notifies the user of the transfer via user device 110.

Figure 3C:
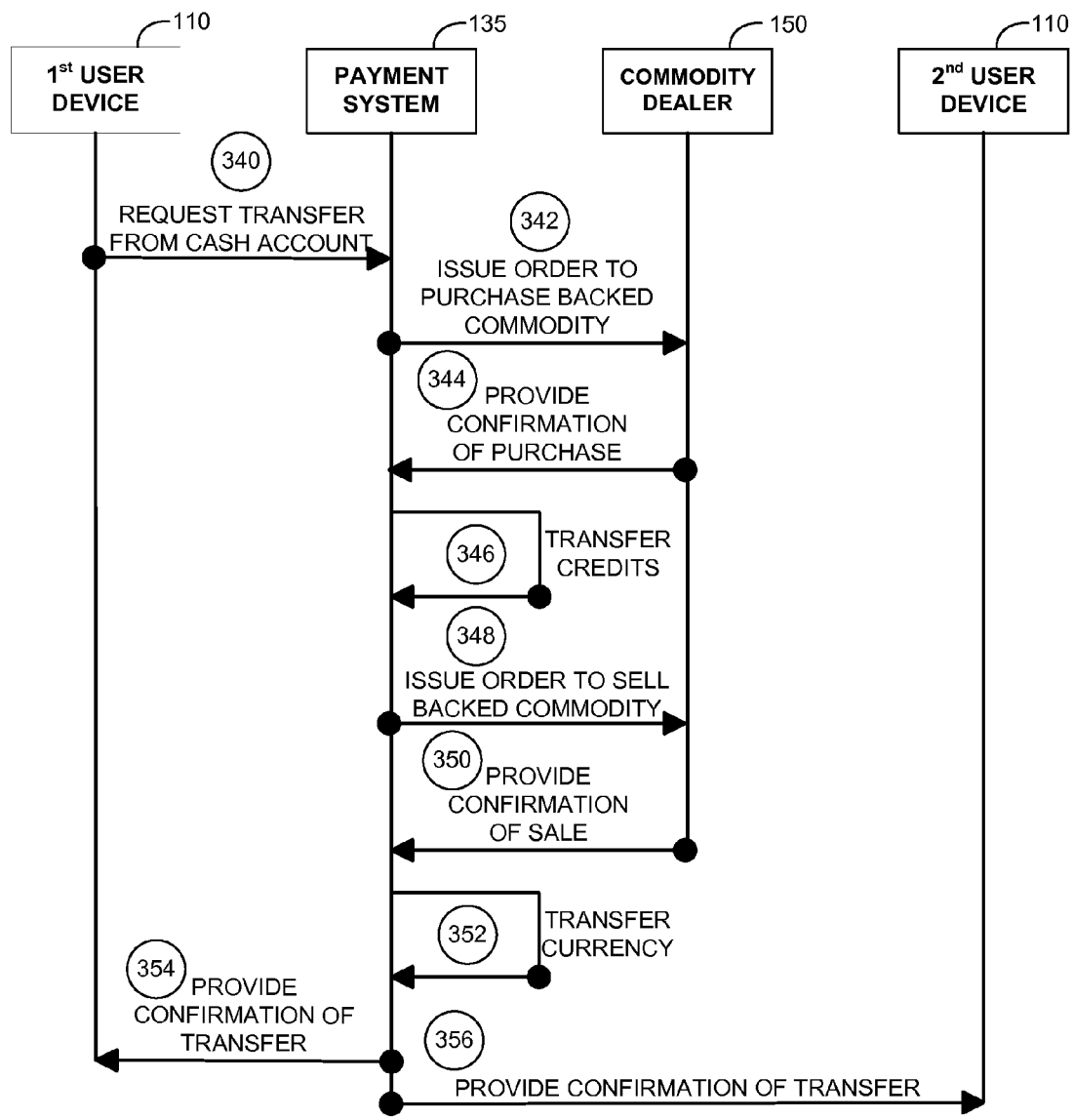
FIG. 3C is a transaction diagram that depicts the steps performed by a user device, a social network payment system and a commodity dealer to enable a user to transfer funds from a cash account to the cash account of another user.
Figure 3D:
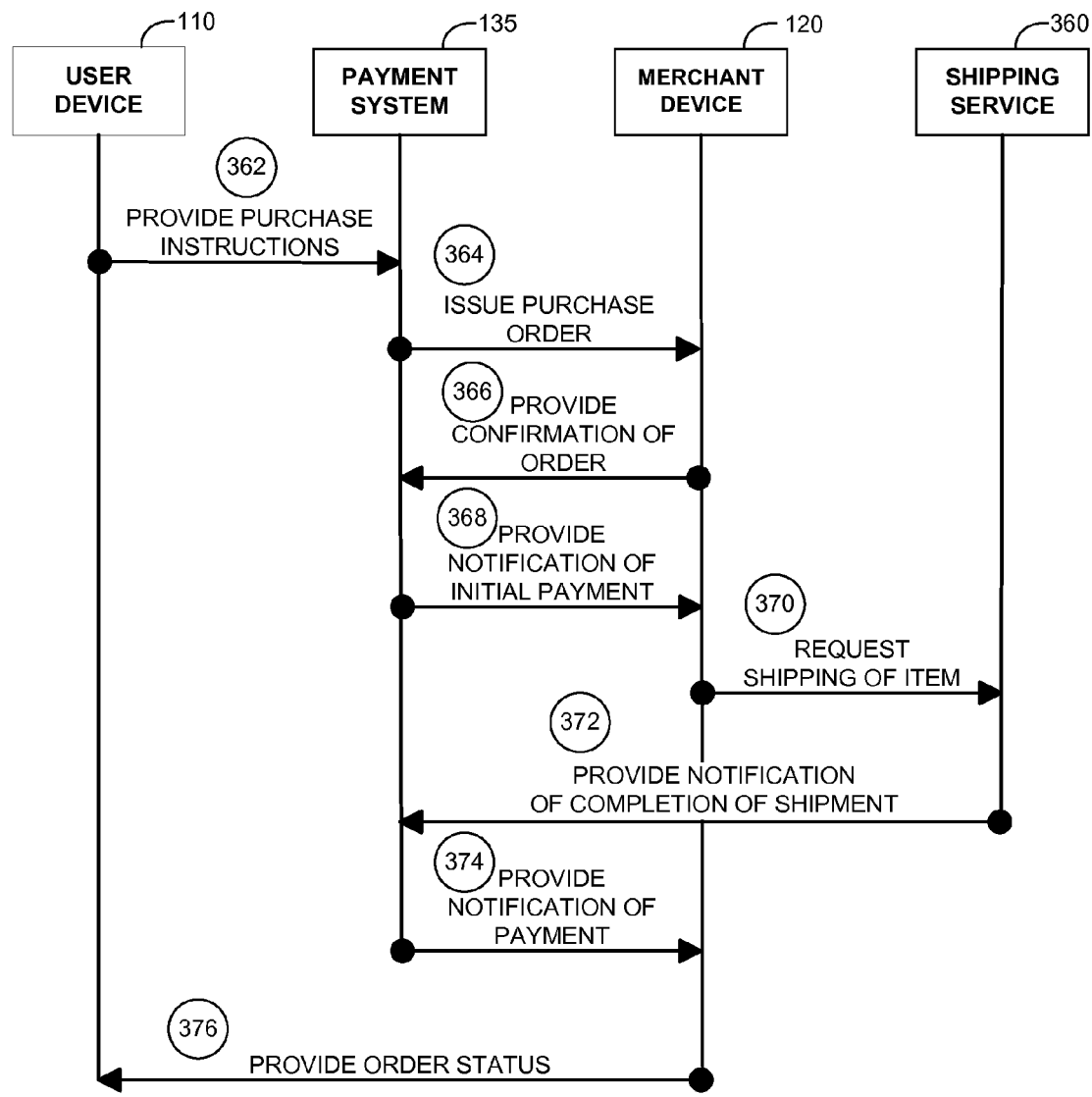
FIG. 3D is a transaction diagram that depicts the steps performed by a user device, a social network payment system, a merchant device and shipping service.

FIG. 3C is a transaction diagram that depicts the steps performed by a user device, a social network payment system and a commodity dealer to enable a user to transfer funds from his/her cash account to the cash account of another user. In this embodiment, currency transfers are first converted to commodity backed cafe credits and then transferred are journalled between cafe accounts. This approach has the advantage of using commodity backed accounts to transfer funds.

A first user initiates the sequence by using user application 115 to request a transfer of funds from his/her cash account to the cash account of a second user. Consequently, at step 340 user device 110, in which user application 115 executes, sends a executes, sends a request message to payment system 135 to perform a cash account-to-cash account transfer. The request message includes the amount of local currency to be transferred and information about the recipient of the transfer, i.e. the second user, and the destination account.

At step 342 payment system 135 issues an order to commodity dealer 150 to purchase an amount of the backing commodity equivalent to the transfer amount requested at the prevailing market rate of the backing commodity. At step 344 commodity dealer, after executing the purchase order, provides a confirmation of purchase to payment system 135 indicating the amount of the commodity purchased, the unit price at which the commodity was purchased, and any applicable transaction fee. The amount of the purchased commodity is converted to credits and is credited, to the first user's cafe account.

At step 346 payment system 135 transfers the commodity backed credits from the first user's cafe account to the second user's cafe account. At step 348 payment system 135 issues an order to commodity dealer 150 to sell an equal amount of the backing commodity at the prevailing market rate. At step 350 commodity dealer, after executing the sale order, provides a confirmation of purchase to payment system 135 indicating the amount of currency realized from the sale of the commodity, and their fee for performing the transaction. At step 352 the currency realized from the sale is transferred by payment system 135 from the 2nd user's cafe account into his/her cash account. In one embodiment, payment system 135 adds an amount of cash equal to any transaction fees assessed by commodity dealer 150 to the second user's cash account so that, effectively, the second user does not pay any transaction fee. In another embodiment, the transaction fee reduces the amount of currency realized by the second user. In yet another embodiment, the transaction fees are assessed to the first user's account.

Finally, at step 354 payment system 135 electronically notifies the first user of the transfer via their user device 110; similarly, at step 356 payment system 135 electronically notifies the second user of the transfer via their user device 110.

Figure 4:
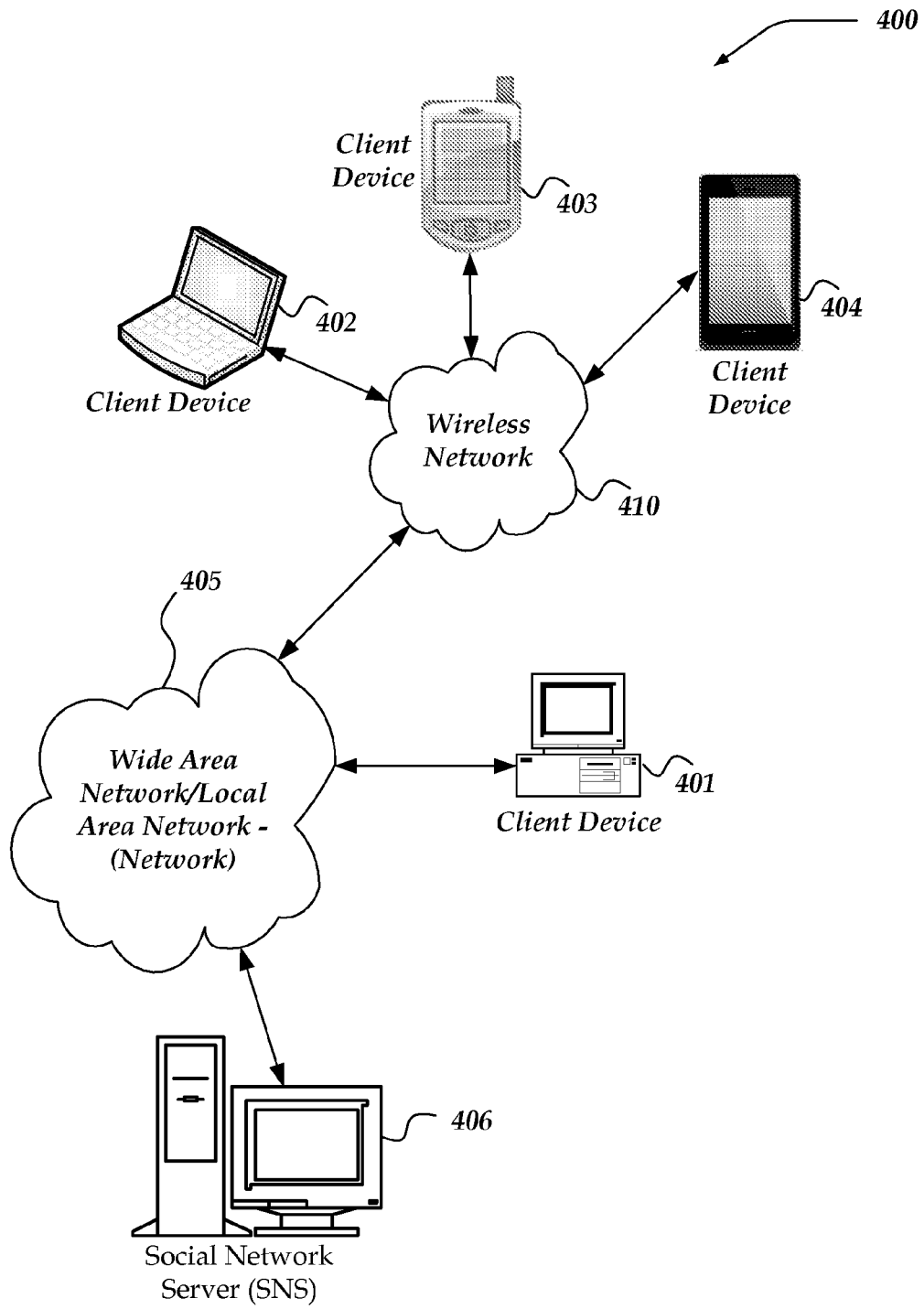
FIG. 4 is a system diagram that shows components of one exemplary environment in which the invention may be practiced.

FIG. 4 is a system diagram that shows components of one exemplary environment in which the invention may be practiced. Not all of the components may be required to practice the invention, and variations in the arrangement and types of the components may be made without departing from the spirit or scope of the invention. As shown, system 400 of FIG. 4 includes wide area network ("WAN")/local area network ("LAN")—(network) 405, wireless network 410, client devices 401-604, and a social network server (SNS) 406.

Client devices 401-404 are embodiments of user device 110 and merchant device 120, which may connect to either or both of wireless network 410 or network 405. Further, SNS 406 is an embodiment of social network 130.

Generally, client devices 401-404 include any computing devices that are capable of receiving and sending messages over a network, such as network 605 or wireless network 410 including, network PCs, or the like. Client devices 401-404 include personal computers, multiprocessor systems, microprocessor-based or programmable consumer electronics, mobile devices such as mobile telephones, smart phones, display pagers, tablet computers, handheld computers, laptop computers, wearable computers, or the like.

A Web-enabled client device can communicate across the Web. It may include a browser application that is configured to receive and to send web pages, web-based messages, or the like. The browser application may send, receive and display graphics, text, multimedia, or the like, employing a network protocol such as Hypertext Transfer Protocol (HTTP) and/or wireless application protocol (WAP).

Client devices 401-404 may include client application programs that send and receive content to/from other computing devices. Examples of application programs include calendars, browsers and email clients and so forth. Client devices 401-404 may be configured to include an application program that enables a user to access and use a social network such as that provided by SNS 406. Client devices 401-404 may also be configured to include application programs used by a merchant, a contributor of media items, or a user for the purpose of licensing media items, in cooperation with a social network server such as SNS 406, such as those described herein.

Wireless network 410 is configured to couple client devices 402-404 with network 405. Wireless network 410 may include any of a variety of wireless networks that provide a connection for client devices 402-404. Such networks may include mesh networks, wireless LAN (WLAN) networks, cellular networks, or the like. Wireless network 410 may further include network devices such as gateways routers, or the like. In essence, wireless network 410 may include virtually any wireless communication device or mechanism by which enables information to travel between client devices 402-404 or another computing device, network, or the like.

Network 405 is configured to couple SNS 406, and client device 601 with other computing devices, including through wireless network 410 to client devices 402-604. Network 405 may include the Internet in addition to local area networks (LANs), wide area networks (WANs), direct connections, combinations thereof or the like.

SNS 406 represents a network computing device that is configured to social network functions including those functions provided by payment system 135. Devices that may operate as SNS 406 include, but are not limited to personal computers, desktop computers, multiprocessor systems, microprocessor-based or programmable consumer electronics, network PCs, servers, network appliances, and the like.

Although SNS 406 is illustrated as a distinct network device, the invention is not so limited. For example, a plurality of network devices may be configured to perform the functions of SNS 406. One such configuration is a "server farm" that includes multiple server computers operating cooperatively, each performing some of SNS 406 server functions. One embodiment of the software modules that perform payment system 135 server functions, that operate in SNS 406 server functions is described with reference to FIG. 5 below.

SNS 406 functions may also be provided by a cloud computing facility in which the services, features and functions ascribed herein to SNS 406 are delivered as a service over a network, such as the Internet, rather than by a specific server or cluster of servers.

SNS 406 is capable of running application programs ("applications"). Applications that may be run by SNS 406 include transcoders, database programs, customizable user programs, security applications, encryption programs, VPN programs, web servers, applications servers, account management systems, and so forth. Applications run by SNS 406 may also include a user interface, a merchant interface, a database manager, and other applications and processes such as those described below in conjunction with FIG. 5.

SNS 406 typically provides web services which include any of a variety of network services that are configured to provide content, including messages, over a network to another computing device. Thus, web services include for example, an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, including variants such as HTML5, XML, JSON, SOAP or the like. Web services may also include server-side scripting languages such as PHP, Python, and Java servlets. Web services may also include the server side of the Ajax web development method that enables a server to asynchronously respond to Ajax requests.

SNS 406 includes data storage for storing program code and data. Data storage may include virtually any mechanism usable for storing and managing data, including but not limited to a file, a folder, a document, a web page or an application, such as a database, digital media including digital images and digital video clips, and the like.

Data storage may further represent a plurality of different data stores. For example, data storage may include a database of users, merchants, financial accounts, information required to communicate with commodity dealers, and historical reports such as those described below in conjunction with FIG. 5. Further, data storage may also include network storage or cloud storage in which the physical storage media is accessed across a network.

FIG. 5 is block diagram of the exemplary software modules of user device 110, merchant device 120 and payment system 135.

As discussed above with reference to FIG. 1, a user interacts with user device 110 via user application 115. In a preferred embodiment, user application 115 is a Web application, that is it is written using standard Web programming languages such as HTML, including variants such as HTML5, JAVASCRIPT, and JAVA, and is executed by a browser 510 that runs in user device 110.

Analogously, a merchant interacts with merchant device 120 via merchant application 125. In a preferred embodiment, merchant application 125 is a Web application, that is it is written using standard Web programming languages such as HTML, including variants such as HTML5, JAVASCRIPT, and JAVA, and is executed by a browser 515 that runs in merchant device 120.

Hereinbelow all statements concerning browser 510 apply equally to browser 515. Browsers 510 is typically a standard, commercially available, browser such as MOZILLA FIRE-FOX or MICROSOFT INTERNET EXPLORER.

In one embodiment, browser 510 includes or works in conjunction with a client-side scripting engine that executes client-side scripting instructions written in a client-side scripting or programming language such as JAVASCRIPT® from ORACLE CORPORATION of Redwood Shores, Calif., the Java open source programming language, ACTIVEX® from the MICROSOFT CORPORATION of Redmond, Wash., and the like. In one embodiment, browser 410 is configured to use the Ajax (asynchronous JavaScript and XML or JSON) web development techniques that are used to create interactive web applications. Ajax typically works with XML or JavaScript Object Notation (JSON) and a client-side scripting language such as JavaScript or ActiveX.

In one embodiment, when a user accesses payment system 135 using user application 115, payment system 135 downloads web pages in HTML5 format to browser 510 for viewing and interactive use. To perform advanced client-side interactive functions, the web pages may include client-side scripting instructions. Typically, such client-side scripting instructions are embedded in HTML5 web pages and are interpreted or executed by a client-side scripting engine to perform functions not available through HTML5 commands such as advanced graphics, database access, and computations.

In one embodiment, browser 510 issues hypertext transfer protocol (HTTP) requests to and receives HTTP responses from an application server 520 running in payment system 135.

Application server 520 receives the HTTP requests and invokes the appropriate payment system 135 software module to process the request. Application server 520 may be a commercially available application server that includes a web server that accepts and processes HTTP requests transmits HTTP responses back along with optional data contents, which may be web pages such as HTML5 documents and linked objects (images, or the like). In addition, browser 510 may use Ajax to issue requests for XML or JSON-coded information that is delivered asynchronously by application server 520. Henceforth, the term request message will refer to a message sent by browser 510 using HTTP, Ajax or other client-server communications method to payment system 135. And a response message will refer to a message sent in response, typically using the same communications method, by application server 520 running in payment system 135.

Application server 520 establishes and manages user and merchant sessions. Typically application server 520 assigns each session a unique session id. A session lasts from the time a user (i.e. a user or merchant) logs in, or accesses payment system 135, until the time the user logs out or stops interacting with payment system 135 for a specified period of time. In addition, application server 520 typically manages server applications and provides database connectivity.

Upon request by browser 510, application server 520 downloads to user device 110 or merchant device 120 the HTML5, JavaScript and other browser-executable code that make up user application 115 or merchant application 125, respectively.

Payment system 135 further includes a user interface module 530, a merchant interface module 532, an account manager 534, a commodity manager 536 and report manager 538. Payment system 135 further includes five databases: a user database 540, a merchant database 542, an account database 544, a commodity database 546, and a report database 548. It may be appreciated that each of the abovementioned databases may be implemented as one or more computer files spread across one or more physical storage mechanisms. In one embodiment, each of the abovementioned databases is implemented as one or more relational databases and is accessed using the structured query language (SQL).

User interface module 530, merchant interface module 532, account manager 534, commodity manager 536 and report manager 538. may each include, or may share the use of, a commercial database management system (DBMS) to access and search for data and objects that reside in the database. In a preferred embodiment, the DBMS is a relational DBMS (RDBMS) such as ORACLE® from the Oracle Corporation, SQL SERVER from the Microsoft Corporation, or the like. However, other database managers may also be used. In addition to a RDBMS, a standard data extraction tool may be included that simplifies access to relational databases, enabling a developer to express queries visually or in a simplified manner, rather than using structured query language (SQL).

User interface module 530 responds to requests from user application 115, i.e. it performs the back-end server processing. In one embodiment, upon request, user interface 530 transmits web pages, scripts and other elements as requested by user application 115. As illustrated in exemplary user interface 200, user interface module 530 enables a user to deposit, withdraw, and transfer funds, pay for items using credits and to transfer credits between accounts. In addition, user interface module 530 enables a user to register with social network 130 and edit account information.

Merchant interface module 532 responds to requests from merchant application 125, i.e. it performs the server processing corresponding to the client processing performed by merchant application 125. Merchant interface enables a merchant to register with social network 130, log in, upload and edit information regarding items for sale. Merchant interface 532 provides user interface elements and information to merchant application 125. In one embodiment, upon request merchant interface 532 transmits web pages, scripts and other elements used by merchant application 125.

Account manager 534 manages transactions for all financial accounts including the cafe accounts and cash accounts of registered users and registered merchants. Account manager 534 maintains records for all transactions performed for each account for a period of time.

Commodity manager 536 manages the buying and selling of commodities via commodity dealer 150. Commodity manager 536 may work with multiple commodity dealers, each potentially using different protocols and interfaces, in order to realize real-time, transactions at the best prices.

Report manager 538 generates reports on request for users and merchants. In addition report manager 538 may generate periodic reports, such as monthly reports for each account. In addition, report manager 538 may generate reports for compliance with regulatory agencies such as the U.S. Securities and Exchange Commission (SEC).

In the discussion hereinbelow concerning databases it may be appreciated by one skilled in the art that each database may be implemented as one or more database files, alternatively two or more of the databases may be implemented as a single database file. Further the term database may refer to a relational database file that is accessed by a relational database manager or it may implemented as a B-tree, R-tree, spreadsheet, flat file, comma separated value any other type of suitable data structure stored within one or more computer files.

User database 540 stores a user record for each registered user. A user record includes inter alia name, contact information and means of payment information. Name and contact information is typically obtained during registration. Typically, a user registers with social network 130 prior to making his/her first deposit or purchase.

Merchant database 542 stores a merchant record for each registered merchant. The merchant record includes information such as name and contact information.

Account database 544 stores information about all accounts, including a history of transactions for each account.

Commodity database 546 stores a history of all commodity purchase and sale transactions. In addition, commodity database 546 stores information that enables payment system 135 to interact with various commodity dealers.

Report database 546 stores historical reports, such as monthly statements for each account, tax reports and compliance reports provided to regulatory agencies.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method of payment for a social network, comprising:
   maintaining, by a social network computer system, (i) records of registered users including a first user and a second user, (ii) records of registered merchants, (iii) a credit account for each registered user and each registered merchant wherein credits are backed by a commodity and a credit corresponds to a fraction of a standard unit of the commodity, and (iv) a cash account, in conjunction with said credit account, for each registered user and each registered merchant, wherein funds in the cash account are kept in local currency and are not backed by the commodity, and wherein funds in the first user's cash account are kept in a first local currency and funds in the second user's cash account and/or cash account of a merchant are kept in a second local currency different from said first local currency,
   receiving, by the social network computer system, from a user device of the first user, instructions to deposit a designated amount of first local currency from the first user's cash account, maintained by said social network computer system, into the first user's credit account;
   using the received instructions to deposit a designated amount of first local currency from the first user's cash account, maintained by said social network computer system, into the first user's credit account:
      obtaining, by the social network computer system, the designated amount of first local currency from said first user's cash account maintained by the social network computer system;
      electronically purchasing, by said social network computer system, from a seller an amount of a specified commodity equivalent to the designated amount of first local currency minus any transaction fee assessed by the seller from whom the electronic purchase was made;
      updating, by the social network computer system, the first user's credit account by adding a number of credits equivalent to the amount of the purchased commodity;
   receiving, by the social network computer system, from the user device of the first user an instruction to purchase an item of merchandise or service offered by the merchant and/or an instruction to transfer funds to said second user account;
   using the received instructions to purchase an item of merchandise or service offered by the merchant and/or an instruction to transfer funds to said second user account:
      transferring, by the social network computer system, a designated number of credits from the first user's credit account to the merchant's credit account and/or the second user's credit account;
   receiving, by the social network computer system, from a user device of the merchant and/or the second user instructions to transfer a designated number of credits from the merchant credit account and/or the second user's credit account into the merchant's cash account and/or the second user's cash account;
   using the received instructions to transfer a designated number of credits from the merchant credit account and/or the second user's credit account into the merchant's cash account and/or the second user's cash account:
      electronically instructing, by the social network computer system, a seller to sell in said second local currency an amount of the commodity equivalent to the designated number of credits;
      receiving, by the social network computer system and from the seller electronically instructed to sell in said second currency, an amount of second local currency from selling the equivalent amount of the commodity, minus any transaction fee assessed by the seller electronically instructed to sell in said second currency;
      updating, by the social network computer system, the merchant's credit account and/or the second user's credit account by subtracting the designated number of credits; and
      updating, by the social network computer system, the merchant's cash account and/or the second user's cash account by adding the amount of second local currency received from the seller electronically instructed to sell in said second currency, minus any transaction fee assessed by the seller electronically instructed to sell in said second currency.

2. The method of claim 1 wherein the commodity is gold and the standard unit is a troy ounce.

3. The method of claim 1 wherein said item is an item of merchandise to be shipped to the first user and wherein, using the received instructions to purchase an item of merchandise or service offered by the merchant, transferring, by the social network computer system, the designated number of credits from the first user's credit account to the merchant's credit account for the purchase of said item is made, by the social network computer system, before the merchant ships the item of merchandise to the first user.

4. The method of claim 1 wherein said item is an item of merchandise to be shipped to the first user and wherein, using the received instructions to purchase an item of merchandise or service offered by the merchant, transferring, by the social network computer system, the designated number of credits from the first user's credit account to the merchant's credit account for the purchase of said item is made, by the social network computer system, after the merchant ships the item of merchandise to the first user and the item of merchandise is received by the first user.

5. The method of claim 1 wherein said item is an amount of currency in an online game provided within the social network.

6. The method of claim 1 further comprising:
   receiving, by said social network computer system, from the user device of the first user instructions to transfer a designated number of credits from the first user's credit account into the first user's cash account maintained by said social network computer system;
   electronically instructing, by the social network computer system, a seller to sell an amount of the commodity equivalent to the designated number of credits to transfer from the first user's credit account into the first user's cash account;
   receiving, by said social network computer system, from the seller instructed to sell an amount of the commodity equivalent to the designated number of credits to transfer from the first user's credit account into the first user's cash account, first local currency from selling the equivalent amount of the commodity, minus any transaction fee assessed by the seller;
   updating, by said social network computer system, the first user's credit account by subtracting the designated number of credits to transfer from the first user's credit account into the first user's cash account; and updating, by said social network computer system, the first user's cash account, maintained by said social network computer system, by adding the amount of first local currency received from the seller instructed to sell an amount of the commodity equivalent to the designated number of credits to transfer from the first user's credit account into the first user's cash account, minus any transaction fee assessed by the seller.

7. The method of claim 1 further comprising:

receiving, by said social network computer system, from a user device instructions to transfer a specified amount of cash in the second local currency from the second user's cash account, maintained by said social network computer system, into the second user's credit account;

electronically purchasing, by the social network computer system, from a seller an amount of the commodity equivalent to the specified amount of the second local currency to transfer from the second user's cash account into the second user's credit account, minus any transaction fee assessed by the seller;

updating, by said social network computer system, the second user's credit account by adding a number of credits equivalent to the amount of the commodity, equivalent to the specified amount of the second local currency to transfer from the second user's cash account into said second user's credit account, purchased from the seller; and updating, by said social network computer system, the second user's cash account, maintained by said social network computer system, by subtracting the specified amount of the second currency to transfer from the second user's cash account into said second user's credit account.

8. An apparatus for making payment in a social network, the apparatus comprising:

a memory storing instructions; and one or more processors, wherein said instructions, when processed by the one or more processors, cause:

maintaining by a social network (i) records of registered users including a first user and a second user, (ii) records of registered merchants, (iii) a credit account for each registered user and each registered merchant wherein credits are backed by a commodity and a credit corresponds to a fraction of a standard unit of the commodity, and (iv) a cash account, in conjunction with said credit account, for each registered user and each registered merchant, wherein funds in the cash account are kept in local currency and are not backed by the commodity, and wherein funds in the first user's cash account are kept in a first local currency and funds in the second user's cash account and/or cash account of a merchant are kept in a second local currency different from said first local currency, receiving, by the social network computer system, from a user device of the first user instructions to deposit a designated amount of first local currency from the first user's cash account maintained by said social network computer system, into the first user's credit account;

using the received instructions to deposit a designated amount of first local currency from the first user's cash account, maintained by said social network computer system, into the first user's credit account:

obtaining, by the social network computer system, the designated amount of first local currency from said first user's cash account maintained by the social network computer system;

electronically purchasing, by the social network computer system, from a seller an amount of a specified commodity equivalent to the designated amount of first local currency minus any transaction fee assessed by the seller from whom the electronic purchase was made;

updating, by the social network computer system, the first user's credit account by adding a number of credits equivalent to the amount of the purchased commodity;

receiving, by the social network computer system, from the user device of the first user an instruction to purchase an item of merchandise or service offered by the merchant and/or an instruction to transfer funds to said second user account;

using the received instructions to purchase an item of merchandise or service offered by the merchant and/or an instruction to transfer funds to said second user account:

transferring, by the social network computer system, a designated number of credits from the first user's credit account to the merchant's credit account and/or the second user's credit account;

receiving, by the social network computer system, from a user device of the merchant and/or the second user instructions to transfer a designated number of credits from the merchant credit account and/or the second user's credit account into the merchant's cash account and/or the second user's cash account;

using the received instructions to transfer a designated number of credits from the merchant credit account and/or the second user's credit account into the merchant's cash account and/or the second user's cash account:

electronically instructing, by the social network computer system, a seller to sell in said second local currency an amount of the commodity equivalent to the designated number of credits;

receiving, by the social network computer system, and from the seller electronically instructed to sell in said second currency, an amount of second local currency from selling the equivalent amount of the commodity, minus any transaction fee assessed by the seller electronically instructed to sell in said second currency;

updating, by the social network computer system, the merchant's credit account and/or the second user's credit account by subtracting the designated number of credits; and updating, by the social network computer system, the merchant's cash account and/or the second user's cash account by adding the amount of second local currency received from by the seller electronically instructed to sell in said second currency, minus any transaction fee assessed by the seller electronically instructed to sell in said second currency.

9. The apparatus of claim 8, wherein said item is an item of merchandise to be shipped to the first user and wherein, using the received instructions to purchase an item of merchandise or service offered by the merchant, wherein the memory stores additional instructions which, when processed by the one or more processors, cause:

transferring, by the social network computer system, the designated number of credits from the first user's credit account to the merchant's credit account for the purchase of said item is made by the social network computer system before the merchant ships the item of merchandise to the first user.

10. The apparatus of claim 8, wherein said item is an item of merchandise to be shipped to the first user and wherein, using the received instructions to purchase an item of merchandise or service offered by the merchant, wherein the memory stores additional instructions which, when processed by the one or more processors, cause:

transferring, by the social network computer system, the designated number of credits from the first user's credit account to the merchant's credit account for the purchase of the item is made by the social network computer system after the merchant ships the item of merchandise to the first user and the item of merchandise is received by the first user.

11. The apparatus of claim 8 wherein the commodity is gold and the standard unit is a troy ounce.

12. The apparatus of claim 8 wherein said item is an amount of currency in an online game provided within the social network.

13. The apparatus of claim 8
wherein the memory stores additional instructions which, when processed by the one or more processors, cause:
receiving, by the social network computer system, from the user device of the first user instructions to transfer a designated number of credits from the first user's credit account into the first user's cash account maintained by said social network computer system;
electronically instructing, by the social network computer system, a seller to sell an amount of the commodity equivalent to the designated number of credits to transfer from the first user's credit account into the first user's cash account;
receiving, by the social network computer system, from the seller instructed to sell an amount of the commodity equivalent to the designated number of credits to transfer from the first user's credit account into the first user's cash account, first local currency from selling the equivalent amount of the commodity, minus any transaction fee assessed by the seller;
updating, by the social network computer system, the first user's credit account by subtracting the designated number of credits to transfer from the first user's credit account into the first user's cash account; and
updating, by the social network computer system, the first user's cash account, maintained by said social network computer system, by adding the amount of currency received from the seller instructed to sell an amount of the commodity equivalent to the designated number of credits to transfer from the first user's credit account into the first user's cash account, minus any transaction fee assessed by the seller.

14. The apparatus of claim 8
wherein the memory stores additional instructions which, when processed by the one or more processors, cause:
receiving, by the social network computer system, from a user device instructions to transfer a specified amount of cash in a second local currency from the second user's cash account, maintained by the social network computer system, into the second user's credit account;
electronically purchasing, by the social network computer system, from a seller an amount of the commodity equivalent to the specified amount of the second local currency to transfer from the second user's cash account into said second user's credit account, minus any transaction fee assessed by the seller;
updating, by the social network computer system, the second user's credit account by adding a number of credits equivalent to the amount of the commodity equivalent to the specified amount of the second local currency to transfer from the second user's cash account into said second user's credit account, purchased from the seller; and updating, by the social network computer system, the second user's cash account, maintained by the social network computer system, by subtracting the specified amount of second local currency said second currency to transfer from the second user's cash account into said second user's credit account.

15. A non-transitory computer-readable storage medium including instructions which, when processed by one or more processors, cause a social network computing system to provide a method of payment for a social network, the method comprising:
maintaining, by a social network computer system, (i) records of registered users including a first user and a second user, (ii) records of registered merchants, (iii) a credit account for each registered user and each registered merchant wherein credits are backed by a commodity and a credit corresponds to a fraction of a standard unit of the commodity, and (iv) a cash account, in conjunction with said credit account; for each registered user and each registered merchant, wherein funds in the cash account are kept in local currency and are not backed by the commodity, and wherein funds in the first user's cash account are kept in a first local currency and funds in the second user's cash account and/or cash account of a merchant are kept in a second local currency different from said first local currency,
receiving, by the social network computer system, from a user device of the first user instructions to deposit a designated amount of first local currency from the first user's cash account, maintained by said social network computer system, into the first user's credit account;
using the received instructions to deposit a designated amount of first local currency from the first user's cash account, maintained by said social network computer system, into the first user's credit account:
obtaining, by the social network computer system, the designated amount of first local currency from said first user's cash account maintained by the social network computer system;
electronically purchasing, by said social network computer system, from a seller an amount of a specified commodity equivalent to the designated amount of first local currency minus any transaction fee assessed by the seller from whom the electronic purchase was made;
updating, by the social network computer system, the first user's credit account by adding a number of credits equivalent to the amount of the purchased commodity;
receiving, by the social network computer system, from the user device of the first user an instruction to purchase an item of merchandise or service offered by the merchant and/or an instruction to transfer funds to said second user account;
using the received instructions to purchase an item of merchandise or service offered by the merchant and/or an instruction to transfer funds to said second user account:
transferring, by the social network computer system, a designated number of credits from the first user's credit account to the merchant's credit account and/or the second user's credit account;
receiving, by the social network computer system, from a user device of the merchant and/or the second user instructions to transfer a designated number of credits from the merchant credit account and/or the second user's credit account into the merchant's cash account and/or the second user's cash account;

using the received instructions to transfer a designated number of credits from the merchant credit account and/or the second user's credit account into the merchant's cash account and/or the second user's cash account:
- electronically instructing, by the social network computer system, a seller to sell in said second local currency an amount of the commodity equivalent to the designated number of credits;
- receiving, by the social network computer system and from the seller electronically instructed to sell in said second currency, an amount of second local currency from selling the equivalent amount of the commodity, minus any transaction fee assessed by the seller electronically instructed to sell in said second currency;
- updating, by the social network computer system, the merchant's credit account and/or the second user's credit account by subtracting the designated number of credits; and
- updating, by the social network computer system, the merchant's cash account and/or the second user's cash account by adding the amount of second local currency received from the seller electronically instructed to sell in said second currency, minus any transaction fee assessed by the seller electronically instructed to sell in said second currency.

16. The non-transitory computer-readable storage medium of claim 15 wherein the commodity is gold and the standard unit is a troy ounce.

17. The non-transitory computer-readable storage medium of claim 15 wherein said item is an item of merchandise to be shipped to the first user and wherein, using the received instructions to purchase an item of merchandise or service offered by the merchant, transferring, by the social network computer system, the designated number of credits from the first user's credit account to the merchant's credit account for the purchase of said item is made, by the social network computer system, before the merchant ships the item of merchandise to the first user.

18. The non-transitory computer-readable storage medium of claim 15 wherein said item is an item of merchandise to be shipped to the first user and wherein, using the received instructions to purchase an item of merchandise or service offered by the merchant, transferring, by the social network computer system, the designated number of credits from the first user's credit account to the merchant's credit account for the purchase of said item is made, by the social network computer system, after the merchant ships the item of merchandise to the first user and the item of merchandise is received by the first user.

19. The non-transitory computer-readable storage medium of claim 15 wherein said item is an amount of currency in an online game provided within the social network.

20. The non-transitory computer-readable storage medium of claim 15 wherein the method further comprises:
- receiving, by said social network computer system, from the user device of the first user instructions to transfer a designated number of credits from the first user's credit account into the first user's cash account maintained by said social network computer system;
- electronically instructing, by the social network computer system, a seller to sell an amount of the commodity equivalent to the designated number of credits to transfer from the first user's credit account into the first user's cash account;
- receiving, by said social network computer system, from the seller instructed to sell an amount of the commodity equivalent to the designated number of credits to transfer from the first user's credit account into the first user's cash account, currency from selling the equivalent amount of the commodity, minus any transaction fee assessed by the seller;
- updating, by said social network computer system, the first user's credit account by subtracting the designated number of credits to be transferred from the first user's credit account into the first user's cash account; and
- updating, by said social network computer system, the first user's cash account, maintained by said social network computer system, by adding the amount of currency received by the seller instructed to sell an amount of the commodity equivalent to the designated number of credits to transfer from the first user's credit account into the first user's cash account, minus any transaction fee assessed by the seller.

21. The non-transitory computer-readable storage medium of claim 15 wherein the method further comprises:
- receiving, by said social network computer system, from a user device instructions to transfer a specified amount of cash in said second local currency from the second user's cash account, maintained by said social network computer system, into the second user's credit account;
- electronically purchasing, by the social network computer system, from a seller an amount of the commodity equivalent to the specified amount of the second local currency to transfer from the second user's cash account into said second user's credit account, minus any transaction fee assessed by the seller;
- updating, by said social network computer system, the second user's credit account by adding a number of credits equivalent to the amount of the commodity, equivalent to the specified amount of the second local currency to transfer from the second user's cash account into said second user's credit account, purchased from the seller; and
- updating, by said social network computer system, the second user's cash account, maintained by said social network computer system, by subtracting the specified amount of said second currency to transfer from the second user's cash account into said second user's credit account.

* * * * *